United States Patent [19]

Eldridge

[11] 4,081,911

[45] Apr. 4, 1978

[54] SUNDIAL

[76] Inventor: Albert M. Eldridge, 4711 Chiaperro Trail, Austin, Tex. 78731

[21] Appl. No.: 729,008

[22] Filed: Oct. 4, 1976

Related U.S. Application Data

[63] Continuation-in-part of Ser. No. 577,176, May 14, 1975, abandoned.

[51] Int. Cl.[2] .................... G01C 17/34; G01C 21/02; G04B 49/02

[52] U.S. Cl. .................... 33/270

[58] Field of Search .................... 33/269, 270, 271

[56] References Cited

U.S. PATENT DOCUMENTS

| | | | |
|---|---|---|---|
| 281,527 | 7/1883 | Larsen | 33/270 |
| 794,787 | 7/1905 | Crehore | 33/270 |
| 825,319 | 7/1906 | Hewitt | 33/270 |
| 849,841 | 4/1907 | Goode | 33/270 |
| 2,192,750 | 3/1940 | Mead | 33/270 |
| 2,904,889 | 9/1959 | France | 33/271 |
| 3,417,473 | 12/1968 | Troseth | 33/269 |

*Primary Examiner*—Steven L. Stephan

*Attorney, Agent, or Firm*—Burns, Doane, Swecker & Mathis

[57] ABSTRACT

A sundial comprises a body portion having a cylindrical wall. A gnomon is connected to the body portion to cast a shadow on the cylindrical wall. A pair of flexible sheets are alternately mountable on the cylindrical wall. Fasteners allow rotation of the sheets about the longitudinal axis of the cylindrical surface to correct for differences between local civil time and standard time of the time zone of observation. The time lines are configured in accordance with the equation of time. Each sheet contains time lines which designate the time occurring in either the fall or spring solstice.

5 Claims, 18 Drawing Figures

FIG. 2
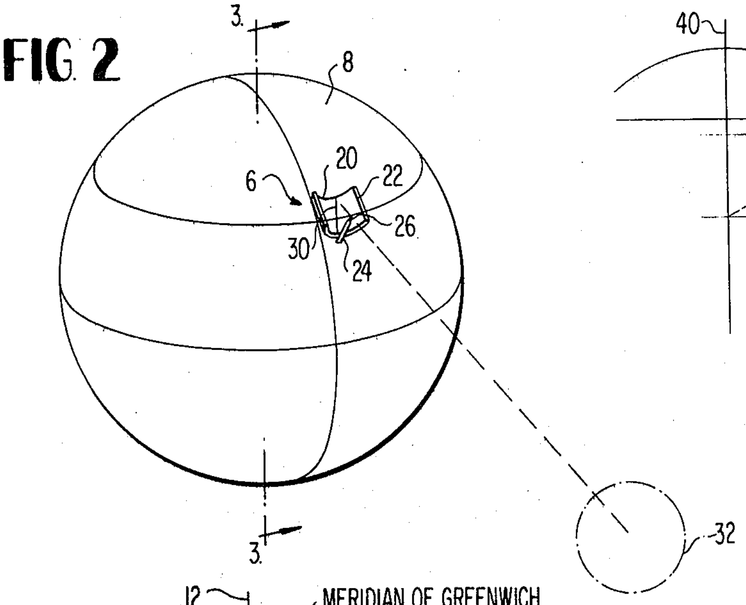
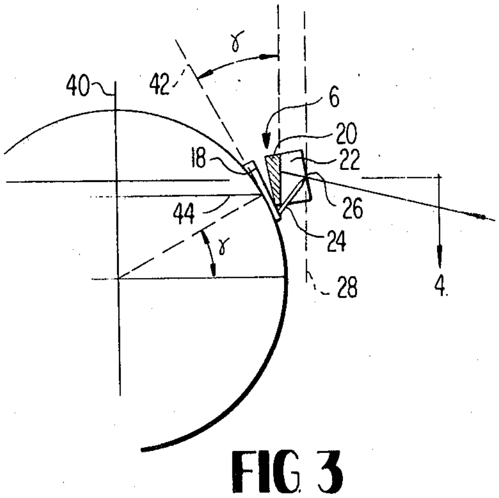
FIG. 3
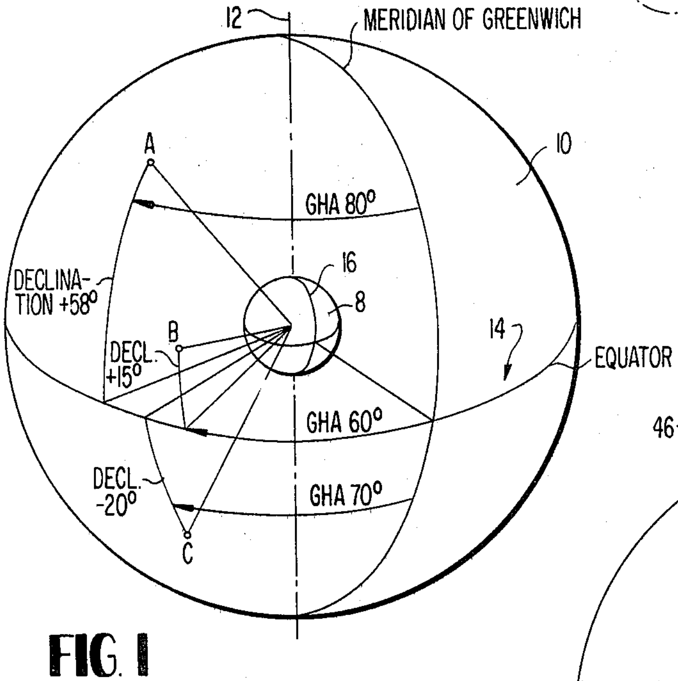
FIG. 1
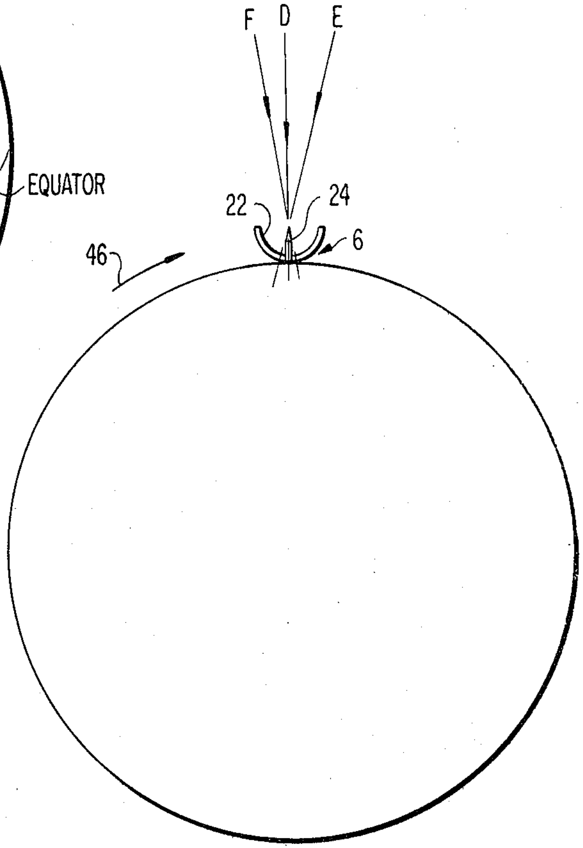
FIG. 4

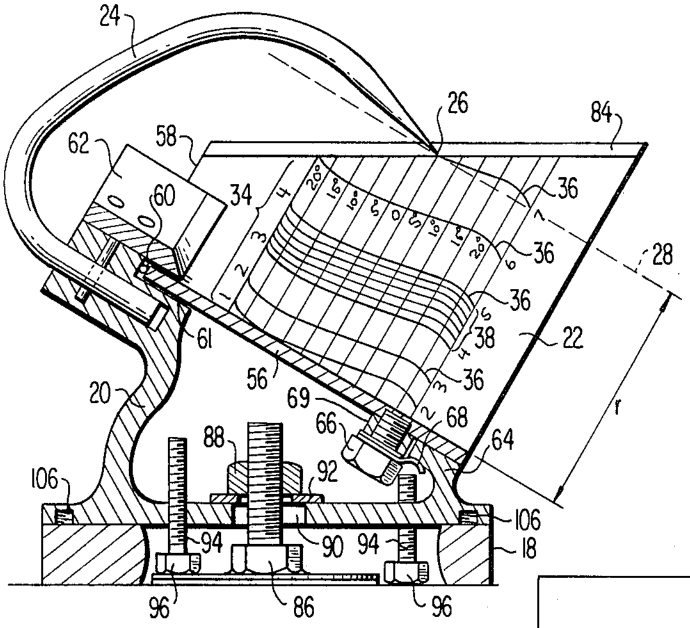
FIG. 5(a)
FIG. 5(b)
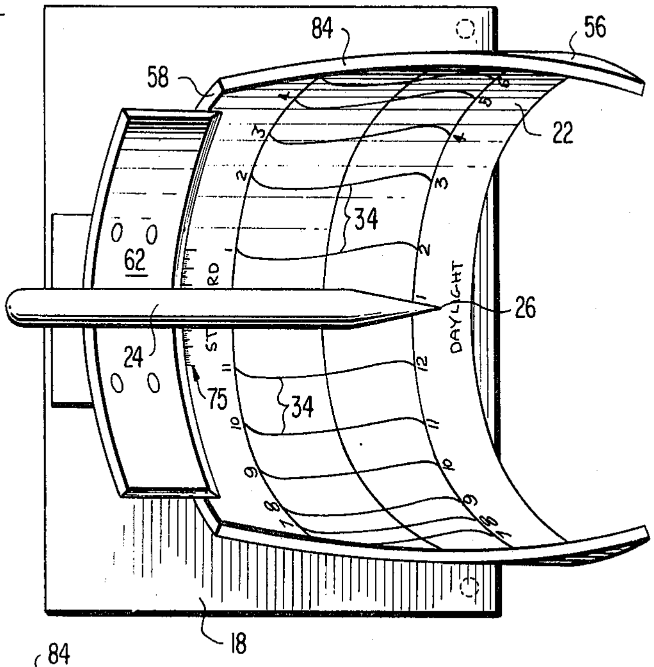
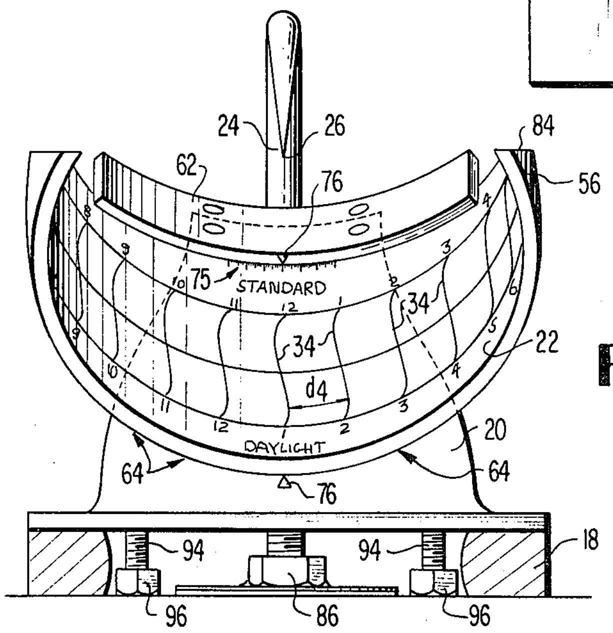
FIG. 5(c)

FIG. 8(a)
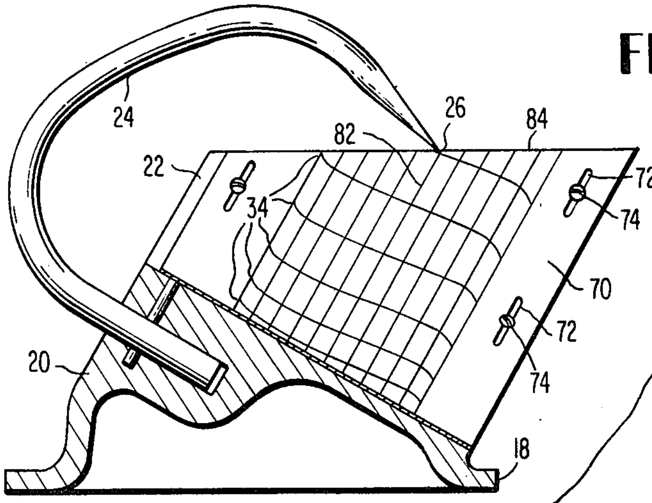
FIG. 8(b)
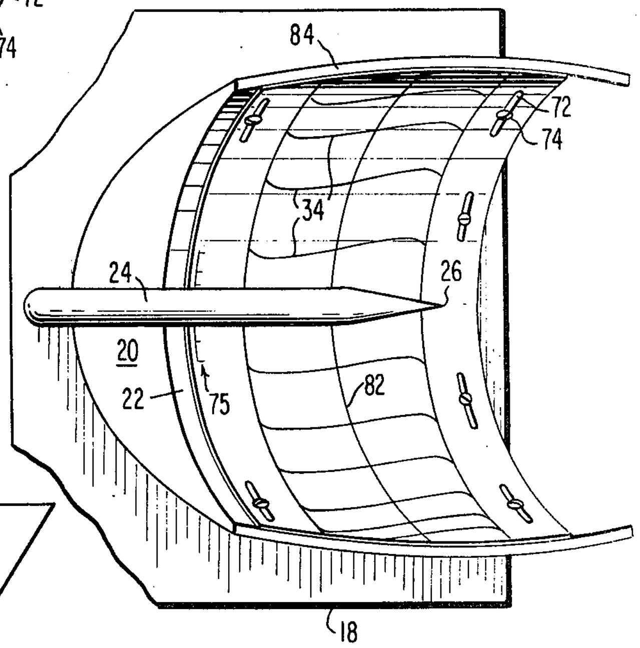
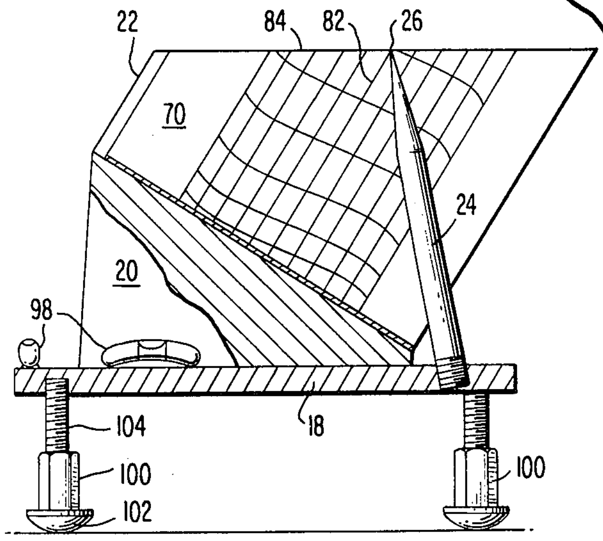
FIG. 9(a)
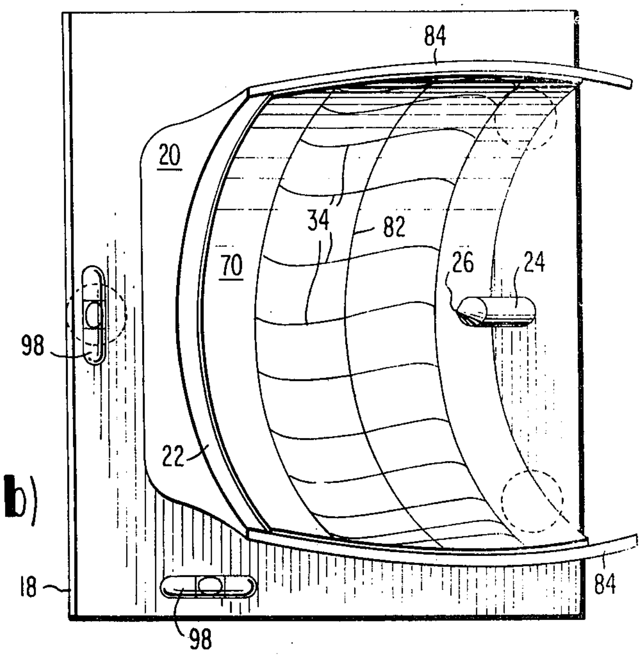
FIG. 9(b)

SUNDIAL

BACKGROUND OF THE INVENTION

This is a Continuation-in-Part of U.S. Serial No. 577,176 filed May 14, 1975 and now abandoned.

The present invention relates generally to a sundial which affords an accurate reading of watch time, i.e. standard time or daylight saving time. More particularly, the invention relates to a sundial which automatically accommodates variations between the Greenwich Hour Angle (GHA) of the sun and the Greenwich Hour Angle of noon Local Civil Time (LCT) as well as differences between Local Civil Time and the standard (or daylight saving) time of the particular zone of time in which the sun is being observed.

Man's earliest attempts to define his activities in terms of time involved observations of the movement or position of various heavenly bodies. The Aztecs, Egyptians, and the inhabitants of the area around Stonehenge, for instance, erected various monuments to define the seasons and guide the planting of crops. Successive refinements led to the capability of dividing time into relatively fine increments so that the day could be defined as a series of rather short, discrete intervals of time. With regard to the measurement of time during the daylight hours, the instruments employed ultimately evolved into the well known sundial having a triangular gnomon and a planar face calibrated circularly to read generally in hours and divisions thereof.

Basic problems have always interfered with the use of sundials to define time. In particular, the sundials simply have not afforded an accurate reading of time. One particularly basic problem interfering with the accuracy of sundials is the fact that the earth travels in an elliptical, rather than circular, path around the sun. In actuality, the time at which the sun is overhead may either precede or follow the time at which the sun should be overhead if the earth were rotating in a circular path. In other words, at the time at which the sun should be overhead on the basis of a circular path of rotation, the sun may in fact be either ahead or behind the actual overhead position. Most sundials of the prior art do not consider this problem and simply indicate noon when the sun is in fact overhead. No consideration is given to the relation between the time which can be read from the sundial and the time given by a mechanical timepiece. The error resulting from the assumption that the earth travels in a circular path may amount to more than one quarter of an hour on certain days of the year. This problem is most commonly expressed in terms of the Greenwich Hour Angle (GHA) of the sun as compared to the hour angle of noon Local Civil Time (LCT). Using this approach, the problem resides in the fact that the GHA of the sun either exceeds or is less than the GHA of noon LCT.

The matter of accuracy is further complicated by the fact that the degree by which the GHA of the sun exceeds or is less than the GHA of noon LCT varies with the declination of the sun. These problems, i.e., the differences between the GHA of the sun and the GHA of noon LCT and the variations of these differences throughout the year thus cannot be conveniently corrected by mere recalibration of the sundial.

A further problem occurs as a result of the division of the earth into time zones. The United States in particular is divided into Eastern, Central, Mountain, and Western Time zones. The time within each zone is constant by convention and is based upon the time at a standard meridian generally located near the midpoint of each zone. At various points east and west of the zone standard meridian it will actually be later or earlier than the time at the standard meridian. As a result the time as indicated by the sundial does not coincide with that indicated by a mechanical timepiece within the zone. Thus, the sundials of the prior art may involve an error of as much as one-half hour based simply on difference between the longitude of the standard meridian and the longitude of the particular point of observation of the sun. These sundials further appear incapable of being conveniently and accurately adjusted to remove this inaccuracy.

Other sundials of the prior art pose the rather difficult problem that they are not easily read. Many require a confusing mapping of lines, dates, numbers, and/or multiple scales which must be used collectively to determine the time of any given day. Other sundials of the prior art may require frequent adjustment prior to or during reading. It will be appreciated that the character of the scale employed by a sundial depends upon the configuration of the instrument. Thus, many sundials of the prior art require a non-linear scale to compensate for the particular configuration chosen for the instrument. A further problem precipitated by the configuration of the instrument involves the distortion of the shadow cast by the gnomon as the earth moves on its axis. Many sundials of the prior art simply fail to adequately minimize this distortion.

The movement of the sun and the resulting shadow cast can give rise to considerable amounts of information. Because the declination of the sun varies continuously between the extreme values marked by the summer and winter solstices, and because the position of the shadow cast by a gnomon varies in a corresponding manner, the shadow cast can be employed to define within reasonable accuracy the month and date of the year. Many sundials of the prior art are simply not arranged so as to provide this sort of information.

Other sundials of the prior art provide no indication of the time of sunrise or sunset. Sunrise and sunset are defined as the time the upper limb of the sun rises above and dips below, respectively, the sensible horizon. Generally during these two portions of the day the light near the surface of the earth is quite subdued. Furthermore, there is the added problem that the time of sunrise and sunset varies within the declination of the sun. As a result, the definition of the time of sunrise and sunset is not even contemplated by most sundials of the prior art.

As the earth moves about the sun and the declination of the sun changes, the days become shorter in terms of the number of daylight hours. To provide more hours per working day, the time can be artificially changed by turning ahead the mechanical timepieces of a particular zone one or more hours. The time designated thereafter is termed daylight saving time. The change in the reading of a mechanical timepiece of course is usually simple to arrange. However, many sundials of the prior art cannot be adjusted and as a result the reading provided is inaccurate.

The value of the declaration of the sun has a number of significant applications. The value is used, for instance, in navigation and surveying. As indicated earlier, the declination varies continuously throughout the year and indeed from year to year. Furthermore, the value of the declination of the sun is only meaningful if it can be determined for a particular date. Thus, the declination of the sun is most commonly derived from charts expressly prepared for this purpose. If only an approximate value of the declination is desired, a properly configured sundial might be made to provide this information for the date of interest. Unfortunately, most sundials of the prior art do not appear capable of providing this information.

To function properly, a sundial must be properly oriented. In many cases a fixture may not be available to ensure this proper orientation. Thus, it may be necessary to adjust the orientation of the sundial. This can be a particularly difficult problem if it is intended that the sundial be portable. Many sundials of the prior art simply do not contemplate adjustability and as a result the readings given thereby may be considerably in error.

The problems suggested in the preceding while not exhaustive are among many which may tend to reduce the effectiveness and desirability of sundials of the prior art. Other noteworthy problems may also exist. However, those presented in the discussion above should be sufficient to demonstrate that sundials of the prior art have not been entirely satisfactory.

OBJECTS AND SUMMARY OF THE PREFERRED FORMS OF THE INVENTION

In light of the foregoing, it is a general object of the invention to provide a novel sundial which obviates or minimizes the problems discussed.

It is a principal object of the invention to provide a novel sundial which employs the hour angle of the sun to provide an accurate reading of standard or daylight saving time.

It is another object of the invention to provide a novel sundial which accommodates and automatically corrects for differences between the Greenwich Hour Angle of the sun and the Greenwich Hour Angle of noon Local Civil Time over the full course of a year.

It is still another object of the invention to provide a novel sundial which accommodates and, upon convenient and accurate adjustment, automatically corrects for differences between Local Civil Time and standard or daylight saving time in the zone of time in which the sun is being observed.

It is yet still another object of the invention to provide a novel sundial from which the standard or daylight saving time for the zone of time in which the sun is being observed can be easily read.

It is a further object of the invention to provide a novel sundial which is configured so that the scale affording a reading of time can be linear.

It is a still further object of the invention to provide a novel sundial which is configured so that the shadow cast by the gnomon is relatively sharp and not unduly distorted as the earth rotates upon its axis.

It is a yet still further object of the invention to provide a novel sundial arranged so that the shadow cast by the gnomon provides a reading of not only the time of day but the month and approximate day of the year as well.

It is still another object of the invention to provide a novel sundial which accurately defines the times of sunrise and sunset for a particular locality on a chosen date.

It is yet still another object of the invention to provide a novel sundial which presents a reading of time in either daylight saving time or standard time.

It is a still further object of the invention to provide a novel sundial which defines the declination of the sun for a particular chosen date.

It is a yet still further object of the invention to provide a novel sundial, the orientation of which can be accurately adjusted so as to afford an accurate reading of the time of day.

A novel sundial intended to accomplish the foregoing objectives involves a body portion which is connected to a base and which has a concave inward, cylindrical surface of fixed radius $r$. The body portion of the sundial carries a gnomon, the tip of which coincides with the longitudinal axis of the cylindrical surface. The gnomon casts a shadow on the cylindrical surface which is dependent upon the hour angle and declination of the sun. The cylindrical surface of the sundial carries a plurality of generally parallel, equally spaced time lines which extend in a direction which is essentially longitudinal of the longitudinal axis of the cylindrical surface. These time lines are longitudinally bounded by lines which extend circumferentially around the cylindrical surface and which are spaced apart a distance $d_1$. The distance $d_1$ is defined approximately by the equation $d_1 = 2r \sin 23.5°$. The time lines vary from time lines strictly parallel to the longitudinal axis of the cylindrical surface by a distance $d_2$. The distance $d_2$ is defined approximately by the equation $d_2 = 2r\,\pi\,\alpha/180°$, which figure $d_2$ may be empirically modified to some extent. Alpha is the angle defined by the algebraic difference between the Greenwich Hour Angle of the sun and the Greenwich Hour Angle of noon Local Civil Time. The time lines can be conveniently and accurately collectively rotated a distance $d_3 = r\,\pi\,\theta/180°$ where $\theta$ is the angular difference between the longitude of observation and the longitude of the standard meridian of the pertinent time zone. The rotation conveniently and accurately corrects for differences between local civil time and standard or daylight saving time. The time lines include principal time lines denominated hour lines and spaced apart a distance $d_4 = r\,\pi\,(15°)/180°$ The shadow cast by the tip of the gnomon and falling on one or between two of the time lines indicates the time of day.

THE DRAWINGS

Other objects and advantages of the present invention will become apparent with reference to the detailed description to follow of a preferred embodiment thereof wherein like reference numerals have been applied to like elements and in which:

FIG. 1 illustrates a perspective view of the earth and the surrounding celestial sphere with several representative heavenly bodies;

FIG. 2 illustrates a perspective view of the earth and a sundial according to the present invention operating in the Northern Hemisphere;

FIG. 3 illustrates a vertical sectional view taken along the lines 3—3 of FIG. 2;

FIG. 4 represents a sectional view of the earth looking south along the lines 4—4 of FIG. 3;

Figure 5D:
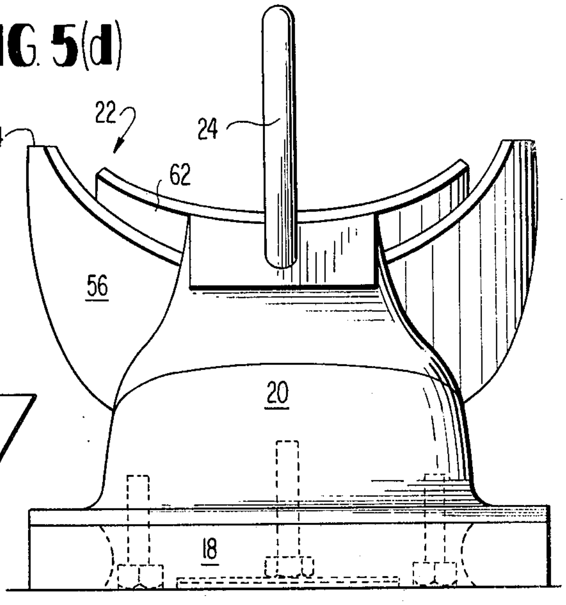
Figure 5E:
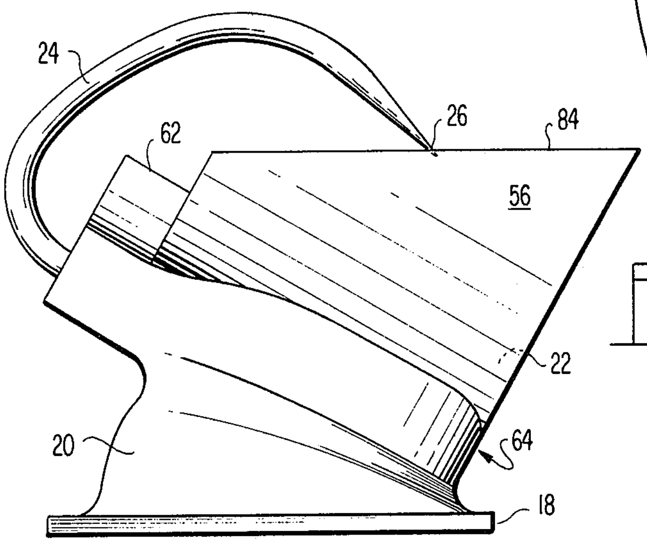
Figure 6:
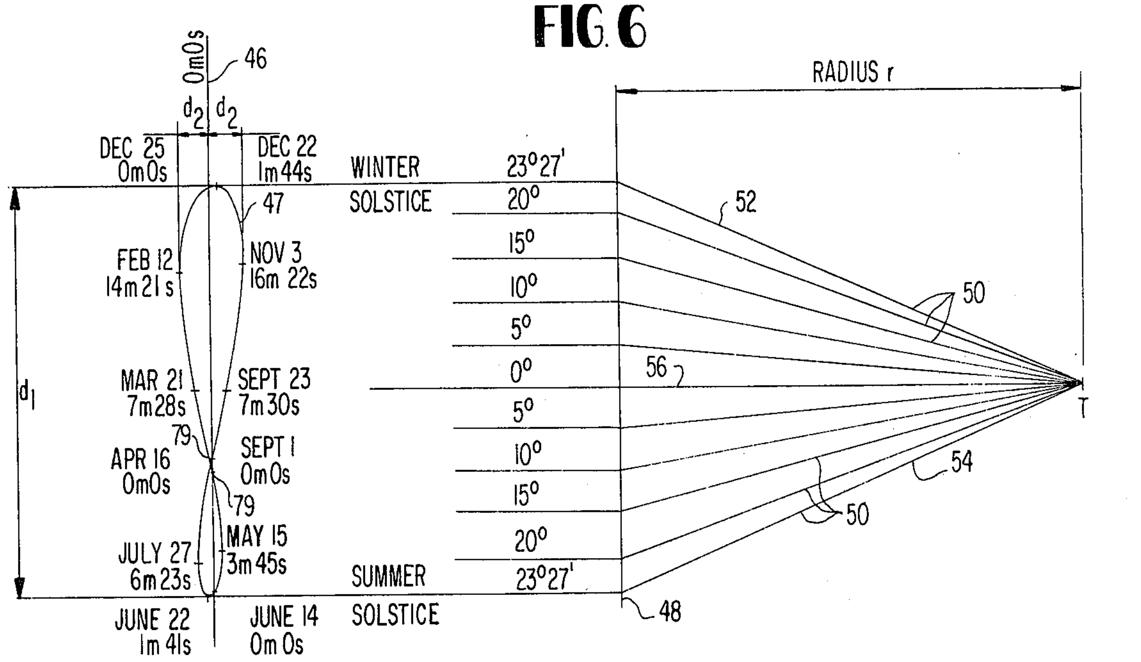
Figure 7A:
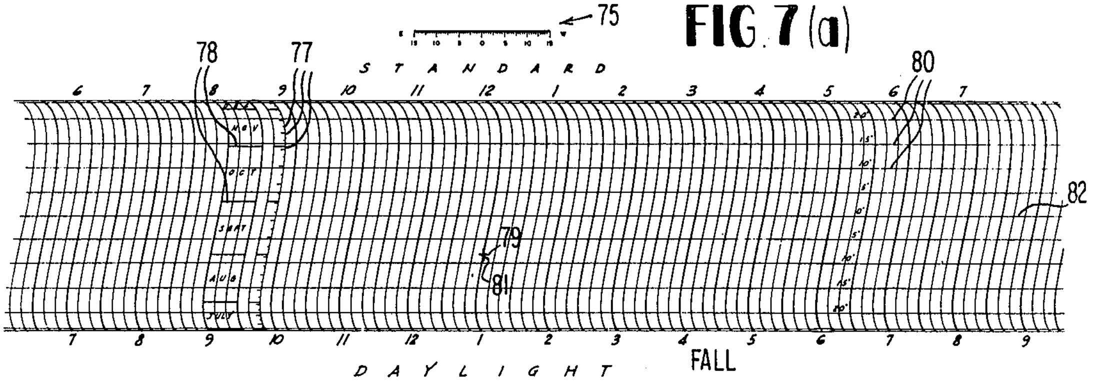
Figure 7B:
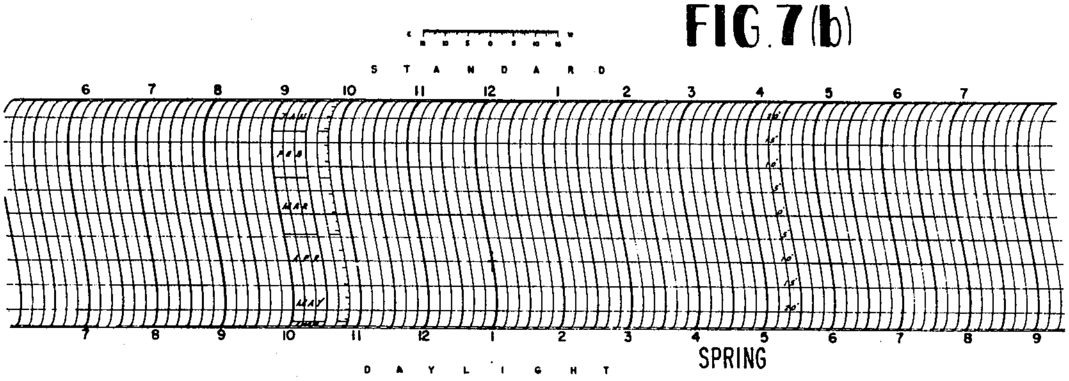
Figure 7C:
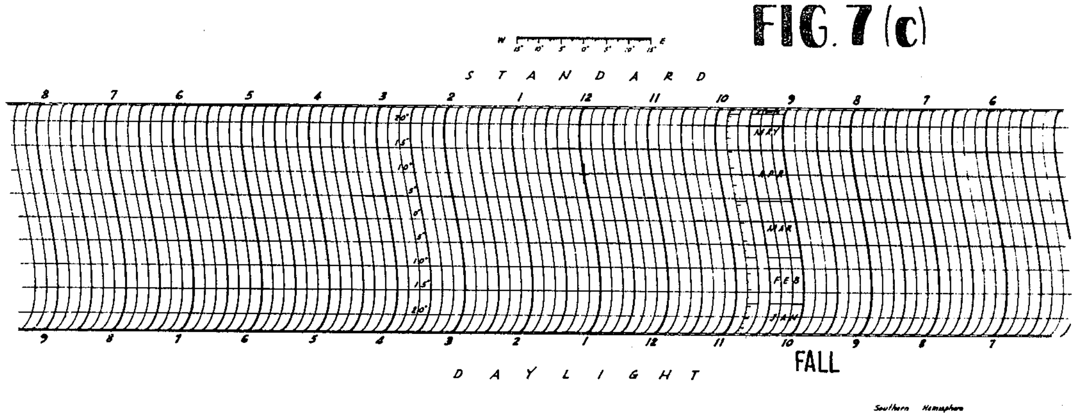
Figure 7D:
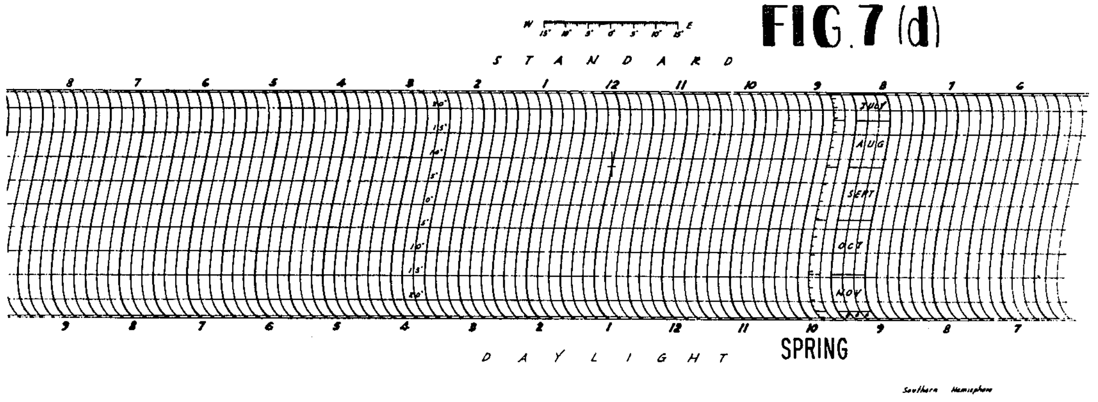

FIGS. 5(*a*) through 5(*e*) illustrate various views of a sundial according to a preferred embodiment of the present invention;

FIG. 6 schematically illustrates the manner in which the time lines of the invention (for the Northern Hemisphere) are generated and the relation thereof to the body of the sundial;

FIGS. 7(*a*) through 7(*d*) illustrate the time lines and other features characterizing the cylindrical surface of the sundial of the present invention for the spring and fall for both the Northern and Southern Hemispheres;

FIGS. 8(*a*) and 8(*b*) illustrate vertical, sectional, and top views of another embodiment of a sundial according to the present invention; and FIGS. 9(*a*) and 9(*b*) illustrate vertical, sectional, and top views of still another embodiment of a sundial according to the present invention.

DETAILED DESCRIPTION

Though the movements of the heavenly bodies are quite complex, the analysis of these movements can be simplified by the use of a few basic assumptions. The most fundamental of these assumptions is that the earth 8, as illustrated in FIG. 1, is stationary and is concentrically surrounded by a rotating celestial sphere 10. An axis 12 formed by the prolongation of the poles of the earth 8 forms the axis of the celestial sphere. Hence, the equatorial planes 14 of the celestial sphere 10 and the earth 8 coincide. The celestial sphere 10 is assumed to have a radius of infinite magnitude and the heavenly bodies outside the solar system of the earth are located by projection to the surface of the celestial sphere. Thus, these heavenly bodies are all fixed relative to one another. The celestial sphere is assumed to rotate relative to the stationary earth at the rate of 360° 59.14 minutes per 24 hours of time. The rotation is from east to west.

The position of a heavenly body is conventionally defined by two quantities, viz., the declination and Greenwich Hour Angle of the body. The declination of the body is measured from the equatorial plane of the celestial sphere and is thus equal to the latitude of the point at which a line projected from the heavenly body to the center of the earth intersects the surface of the earth. For example, if a heavenly body were located at A, B, or C of FIG. 1, the declination thereof would be 58°, 15°, or −°°, respectively.

The declination of the sun varies over a range of approximately 47° of declination, 23.5° on either side of the equatorial plane of the celestial sphere. At the extremum values of the declination of the sun, the sun appears not to move either north or south. The sun reaches its extreme northern declination on June 21 and reaches its extreme southern position on December 22. These two dates are referred to in the Northern Hemisphere as the summer and winter solstice, respectively. As suggested, the midpoint between the summer and winter solstice occurs when the sun is bisected by the equatorial plane of the celestial sphere. This point is referred to as the equinox and is characterized by the fact that night and day are of equal length over the entire earth. The sun is bisected by the equatorial plane of the celestial sphere on two different dates of the year, March 21 and September 22. These two dates are referred to in the Northern Hemisphere as the vernal and autumnal equinox, respectively.

The Greenwich Hour Angle of a heavenly body is defined as the angle measured west from the Greenwich Meridian to the meridian immediately beneath the heavenly body. The Greenwich Meridian is located at 16 on FIG. 1 and if a heavenly body were located, for example, at A, B, or C, the Greenwich Hour Angles would be 80°, 60°, or 70°, respectively. Because the celestial sphere is assumed to rotate from east to west relative to the stationary earth, the Greenwich Hour Angles of all heavenly bodies are continuously increasing. Because the angular speed of rotation of the celestial sphere is known, the increase in the Greenwich Hour Angle of the heavenly body relative to any Greenwich time can be calculated. However, conventionally only the time from Greenwich Midnight ($0^h$) is computed.

The concept of time has two distinct aspects, viz., elapsed time and moment of time. Elapsed time is that which is familiar to most people, i.e., the sort of time of which there are twenty-four hours in a day. This time is also referred to as mean solar time, mean time, or civil time. A moment of time includes the year, month, day, and elapsed time since midnight reckoned from a particular meridian. Greenwich Civil Time, for example, is civil time calculated from midnight at the Greenwich Meridian. Local Civil Time is somewhat more general and is civil time calculated from any chosen meridian.

The sun appears to move around the celestial sphere once every year. Concurrently, the declination of the sun on the celestial sphere changes because the axis of the earth is tilted relative to the plane of the orbit of the earth around the sun. The degree of this tilt varies continuously throughout the year and as the inclination of the axis of the earth varies, the declination of the sun correspondingly changes. As indicated earlier, this declination ranges from approximately 23.5° north to 23.5° south of the celestial equator. In actuality, the earth does not travel around the sun in a truly circular path. Thus, elapsed time is not based upon the actual daily passage of the sun, but rather on the average movement of the sun. In actual fact, the sun is sometimes ahead and sometimes behind noon Local Civil Time by an amount which ranges up to more than one quarter of an hour. The extent of this variation is defined by an equation of time to be discussed in detail at a later point.

Ordinarily time is not defined as a continuous function or longitude, but instead is expressed in increments. In other words, the earth is divided into various areas referred to as time zones, each of which subtend a number of degrees of longitude. In each of these zones, the time used by the population is constant. To this end, there exists in each zone a standard meridian on which the time designated for the zone is essentially correct. However, at all other locations east and west of the standard meridian, the time designated for the zone is not correct. For instance, if the location in question is east of the standard meridian, the actual time at this location is later than that designated for the zone as a whole. Similarly, if the location in question is west of the standard meridian, the actual time is earlier.

As illustrated in FIGS. 2 and 3 and 5(*a*) through 5(*e*), the sundial according to the present invention preferably is comprised of a base 18 which carries a body portion 20. The body portion is concave inward and is characterized by a cylindrical surface 22 of fixed radius *r* (see FIG. 5(*a*)). A gnomon 24 is connected to and cantilevered from the body portion 20 in such a way that a tip 26 thereof coincides with the longitudinal axis 28 of the cylindrical surface 22. As perhaps best illustrated in FIGS. 2 and 3, the gnomon 24 casts a shadow on the cylindrical surface 22 which is dependent upon the hour angle and declination of the sun 32. The gnomon is comprised of a shaft which is relatively heavy and which narrows to the relatively fine tip 26. A configuration of this type optimizes the clarity of the shadow cast by the gnomon during hazy weather.

Disposed on the cylindrical surface, as perhaps best illustrated in FIGS. 5(*a*) through 5(*e*) is a plurality of generally parallel, equally spaced time lines 34. These time lines extend in a direction which is generally parallel to the longitudinal axis 28 of the cylindrical surface and are longitudinally bounded by lines which extend circumferentially around the cylindrical surface. During the course of a day the shadow cast by the gnomon will fall on or between various of these time lines. This interrelation between the shadow cast by the gnomon and the time lines can be employed to define the time of day.

To facilitate the reading of the time of day, the time lines are comprised of a plurality of principal time lines 36 spaced apart about the circumference of the cylindrical surface 22 a distance $d_4$ defined approximately by the formula $d_4 = r\,\pi\,(15°)/180°$ (see FIG. 5(c). The principal time lines are designated as hour lines to represent various hours of the day. At one longitudinal extreme of the hour lines the time is designated in standard time and at the opposite extreme the time is designated in daylight saving time. Between adjacent principal time lines there is disposed a number of secondary time lines 38 also parallel to the hour lines. These time lines define intervals of minutes between the adjacent hour lines 36. These hour lines are illustrated in FIG. 5(a) at 38 between only two adjacent time lines for simplicity. It must be understood that in practice the secondary time lines are disposed between each and every principal time line. These secondary time lines enhance the accuracy with which the time of day can be determined.

In operation, the sundial is oriented so that the longitudinal axis 28 of the cylindrical surface 22 and the polar axis 40 of the earth define a plane which extends essentially north and south through the earth. In other words, the sundial is oriented along a line extending north and south relative to the surface of the earth. Furthermore, in order to present the face of the sundial to the sun in an optimal manner, the sundial is configured as illustrated in FIGS. 3 and 5(a)–5(e) so that the longitudinal axis 28 of the cylindrical surface 22 forms an angle $\gamma$ with a plane normal to the earth's surface, which angle $\gamma$ is equal to the latitude of the point of observation 44 of the sun 32.

The non-uniformity in the rate at which the sun appears to pass around the earth causes a discrepancy between Local Civil Time as would be defined by a mechanical timepiece and the time otherwise indicated by the position of the sun relative to the meridian of observation, i.e., the local meridian. As indicated earlier and as illustrated in FIG. 4, at noon Local Civil Time the sun may have already passed overhead or may as yet not have passed overhead. In other words, the hour angle of the sun may precede or follow the hour angle of noon Local Civil Time. FIG. 4 illustrates schematically the consequence of this non-uniformity in the rate of movement of the sun as seen from the earth at a given meridian of observation. FIG. 4 is a section of the earth taken parallel to the equatorial plane and is looking south. Thus, the sun will appear to move in the direction indicated by the arrow 46. The sundial is indicated generally at 6 and the arrows D, E, and F indicate the approach of rays of sun corresponding to three different positions of the sun. If the sun happens to be directly overhead at noon Local Civil Time, rays of the sun will strike the sundial as indicated by the arrow and would properly indicate noon Local Civil Time. If, however, the sun precedes noon Local Civil Time, rays striking the sundial would move as indicated by the arrow E and the shadow cast by the gnomon 24 of the sundial would fall slightly to the left of the point at which the shadow would have fallen had the sun been located overhead. Similarly, if the sun follows noon Local Civil Time, rays striking the sundial will move in the direction illustrated by arrow F and the shadow of the gnomon 24 will be cast slightly to the right of the shadow which would be cast if the sun were overhead.

The extent to which the hour angle of the sun precedes or follows noon Local Civil Time varies throughout the year and indeed varies throughout any day.

Clearly, this variation in the position of the sun causes an inaccuracy in the reading of the sundial relative to the time indicated by a mechanical timepiece. It should be emphasized that this inaccuracy occurs not only for noon but also for other times throughout the day as well. The position of the sun simply varies relative to where it should be on an average for a given hour and as a result the shadow cast by the gnomon falls on varying points with respect to any given hour of Local Civil Time. The error resulting from the variations in the position of the sun may amount to more than one quarter of an hour for certain days of the year.

As indicated earlier, the extent to which the sun precedes or follows noon Local Civil Time can be defined in degrees by an expression referred to as the equation of time. In particular, the equation of time is $\alpha$ = Greenwich Hour Angle of the sun − Greenwich Hour Angle of noon Local Civil Time. Both hour angles in the equation are concurrently measured or defined and $\alpha$ thus amounts to the algebraic difference between the Greenwich Hour Angle of the sun and the Greenwich Hour Angle of noon Local Civil Time.

If the time of day were to be defined solely by the position of the sun relative to a meridian of observation, the time so defined would be referred to as True Solar Time. True Solar Time thus is a moment of time based on the passage of the sun for the day for a particular point of observation. True Solar Time does not correspond to Local Civil Time because of the variations mentioned in the rate at which the sun moves or appears to move overhead. However, Local Civil Time can be determined from True Solar Time by the formula: Local Civil Time = True Solar Time − Equation of Time. In effect, True Solar Time is corrected for variations in the rate of movement of the sun and the foregoing equation affords a general formula for determining the Local Civil Time for any hour of the day. It would, of course, be extremely cumbersome to apply the correction described in the foregoing to the reading of a sundial.

For a chosen local hour angle $t$, declination $d$, and latitude $l$, the altitude $h$ of the sun from a given point of observation can be defined approximately through the formula $h = \sin^{-1}(\cos t + \tan l \tan d) \cos l \cos d$. Using the altitude derived, the azimuth or bearing of the sun $A_z$ relative to a given point of observation can be determined through the formula $$A_z = \cos^{-1}\left[\frac{\sin d}{\cos h \cos l} - \tan h \tan l\right].$$

The information used in and derived from the two immediately preceding equations has been found to generate lines on a cylindrical surface, of the type incorporated in the sundial of the invention, which are strictly parallel to the longitudinal axis of the cylindrical surface. The parallel character of the lines was discovered and can be demonstrated by plotting on the cylindrical surface for a given local hour angle the points of intersection with the surface of a line projected from the tip of the gnomon through the cylindrical surface. The projected line is inclined to the horizontal and rotated about the vertical to angles defined by the altitude and bearing of the sun. Several such points can be generated by varying the declination employed in the two formulas just presented.

It will be recalled that the tip of the gnomon coincides with the longitudinal axis of the cylindrical surface and thus the line projected therefrom simulates the passage of a ray of sun past the tip of the gnomon to impinge upon the cylindrical surface of the sundial. As will be explained in more detail in the course of subsequent discussion, the tip of the gnomon not only coincides with the longitudinal axis of the cylindrical surface, but also is in a plane essentially perpendicular to the longitudinal axis and essentially bisecting the cylindrical surface. Thus, if one projects a line, from the point defined by the intersection of the longitudinal axis of a cylindrical surface and a transverse plane orthogonally bisecting the surface, at the angles of bearing and altitude determined for a given local hour angle and various declinations, a line will be generated on the cylindrical surface which is parallel to the longitudinal axis. This phenomenon will be similarly observed for other local hour angles. As a result, a plurality of mutually parallel, straight lines strictly parallel to the longitudinal axis of the cylindrical surface can be generated.

Lines generated in this manner represent lines 46 of True Solar Time as shown in FIG. 6, and can be reconfigured to yield Local Civil Time by applying the results of the equation of time. The necessary changes in the lines are effected by varying the time lines on the cylindrical surface of the sundial from lines generated strictly parallel to the longitudinal axis thereof and representing True Solar Time by an amount $d_2$ defined approximately by the equation $d_2 = r\pi\alpha/180°$, $\alpha$ being the appropriate result of the equation of time and $r$ being the radius of the cylindrical surface. The quantity $d_2$ represents a shifting of a time line otherwise strictly parallel to the longitudinal axis and representing True Solar Time from its configuration strictly parallel to the longitudinal axis of the cylindrical surface of the sundial. Alternatively, $d_2$ could be expressed approximately as $d_2 = r \sin \alpha$.

When the equation of time yields a positive value for $\alpha$ for a particular declination of the sun, the Greenwich Hour Angle of the sun precedes noon Local Civil Time and the time lines must curve to the east of the time lines otherwise strictly parallel to the longitudinal axis of the cylindrical surface. Similarly, if the equation of time yields a negative value for $\alpha$ for a particular declination of the sun, the Greenwich Hour Angle of the sun follows noon Local Civil Time and the time lines must curve to the west of the time lines otherwise strictly parallel to the longitudinal axis of the cylindrical surface. Representative $d_2$ distances are shown in FIG. 6, relative to a configuration 47, to be soon discussed, which represents the loci of plotting distances $d_2$ relative to a particular time line 46.

In any case, the time lines as they represent True Solar Time, or reconfigured to reflect Local Civil Time, are longitudinally bounded by circumferential lines 37 spaced apart a distance $d_1$ (as shown in FIG. 6) defined approximately by the equation $d_1 = 2r \sin 23.5°$. It will be recalled that the tip of the gnomon of the sundial according to the present invention defines a point which is both on the longitudinal axis of the cylindrical surface of the sundial and in a plane essentially perpendicular to the longitudinal axis bisecting the cylindrical surface. The intersection of this plane with the cylindrical surface defines a circumferential line which constitutes the line of zero declination of the sun on the face of the cylindrical surface of the sundial. Inasmuch as the sun varies in declination from 23.5° north to 23.5° south of the equatorial plane of the earth, the shadow cast by the tip of the gnomon will move essentially north and south of the line of zero declination of the sun on the cylindrical surface in a progressive manner over the course of a year. If a ray of light is projected from the sun through the tip of the gnomon to the cylindrical surface of the sundial, a variable angle of up to approximately 23.5° will be formed with planes perpendicular to the axis of the cylindrical surface. This phenomenon is observed for both north and south declinations of the sun. Thus, as the sun moves from the summer to winter solstice, or vice versa, the shadow cast by the tip of the gnomon should vary in location from a distance $r \sin 23.5°$ north of the line of zero declination to a distance $r \sin 23.5°$ south of the line of zero declination. Thus, over the course of a year the cumulative travel $d_1$ of the shadow cast by the tip of the gnomon is defined by the formula $d_1 = 2r \sin 23.5°$.

As illustrated in FIG. 6, for a particular point of observation of the sun, any particular time line 46 strictly parallel to the longitudinal axis and indicating True Solar Time is reconfigured to form essentially a figure eight 47 about the strictly parallel line as the declination of the sun varies over the course of the year between the summer and winter solstices. The line 46, in FIG. 6, represents a line on which the shadow cast by the tip of the gnomon would fall if the sun, as assumed, moved about the earth at a constant rate. The point T in FIG. 6 represents the location of the tip of the gnomon, while the vertical line 48 represents the cylindrical surface of the sundial in longitudinal section. The various rays 50 of the sun projected from the point T represent the projection of rays of sun as the sun moves from the declination corresponding to the winter solstice, to the declination corresponding to the summer solstice. Rays 52 and 54 represent particular rays that would impinge upon the sundial during the winter and summer solstices, respectively. The ray 56 represents the ray impinging the sundial at the point or line of zero declination of the sun on the dial. It will be noted that to the left of the line 48 the various angles of the rays 50 corresponding to the various declinations of the sun are listed from zero degrees to approximately 23.5°. The figure 23.5° is only approximate and is used for convenience. More accurately, the sun varies in position from extremum declinations north and south of 23°, 27 minutes.

As shown in FIG. 6, since the configuration 47 is computed in accordance with the "$d_2$" equation, so as to afford improved accuracy in accordance with the FIG. 4 discussion, the longitudinal axis of FIG. 47 is not parallel to the longitudinal lines of the sundial face, i.e., configuration 47 is "canted" in relation to line 46.

Adjacent the figure eight 47 formed about the line 46 are a number of dates and corresponding values of the equation of time which are critical to the configuration of the figure eight. Knowing the value yielded by the equation of time for $\alpha$ in minutes, the distance of the line forming the figure eight 47 from the line 46 can be defined in inches, or for that matter, in any other unit of length. The determination of the distance can be effected by realizing that in a 24-hour period of time, containing 1440 minutes, the shadow cast by the gnomon should move around a full circumference C of the cylindrical surface (assuming a transparent earth). This distance C is defined by the equation $C = 2\pi r$, where $r$ is the radius of the cylindrical surface. Since the distance C will be travelled in 1440 minutes, an equation of scale, 1440 minutes = 2 $r$ can be developed. Thus, 1 minute = $2\pi r/1440$ and the distance so defined will be in the units of $r$. Once this factor for 1 minute of time is derived, it can be applied to the times yielded by the equation of time to define a distance. Alternatively, the distance between the line 46 and the line forming the figure eight 47 can be defined by the equation $d_2 = r\alpha$, where $\alpha$ is the result of the equation of time expressed in radians. The distance $d_2$ can also be defined by the equation $d_2 = r\pi\alpha/180°$ if $\alpha$ is in degrees since the factor $\pi/180°$ effects the conversion to radians.

The equation of time varies somewhat relative to declination from year to year and this may engender minor empirical modifications of the $d_2$ figures. It has been discovered, however, that for each critical point on the figure eight 47 surrounding the line 46, a plotting of declination versus the result of the equation of time for a series of years yields essentially a straight line. If the data forming the straight line is averaged, the increment of the equation of time separating the point defined by the averaged data from the point of interest, e.g., the point of zero declination or zero equation of time, can be determined. An ephemeris can be used to obtain the total change in the equation of time over an entire day corresponding to the date of the critical point. Using this information, a ratio of the increment of the equation of time over the change for an entire day can be formed. If this ratio is multiplied times 24 hours, the average Greenwich Civil Time at which the phenomenon of interest occurs can be determined. Knowing the average Greenwich Civil Time at which the critical phenomenon occurs, the relation of this time to noon Local Civil Time can be determined. Knowing the number of hours difference between the Greenwich Civil Time of the event and noon Local Civil Time, the change in the declination which will occur in this interval of time can be calculated by multiplying the number of hours times the hourly change in declination given for the pertinent date by an ephemeris. This process yields the most accurate information for locating the critical date and corresponding value of the equation of time on the cylindrical surface of the sundial. Performing this operation for all of the critical points and correctly locating these points on the cylindrical surface of the sundial optimizes the accuracy of the figure eight 47 formed about the line 46. However, even with such corrections the $d_2$ figures will be considered to approximately define the curve 47, for purposes of this discussion.

The figure eight illustrated in FIG. 6 can be formed for each and every time line across the full face of the cylindrical surface of the sundial and each can be marked to indicate the appropriate time of day. The tip of the gnomon casts a shadow which will fall upon or between various of the time lines over the course of the day to indicate the time of day.

Preferably the time lines are collectively bisected longitudinally and as bisected (i.e., bisected from tip extremity to tip extremity) are collectively alternately disposed on the cylindrical surface of the sundial to alternately provide time lines for the fall and spring months. In other words, two different sets of lines are applied to the cylindrical surface, one for fall and one for spring. These two different sets of lines are perhaps best illustrated in FIGS. 7(*a*) through 7(*d*) and correspond to lines 34, 36 previously discussed. It will be noted that FIGS. 7(*a*) and 7(*b*) are to be employed in the Northern Hemisphere, while FIGS. 7(*c*) and 7(*d*) are employed in the Southern Hemisphere. The time lines generated for the Southern Hemisphere are, of course, generated in the same manner as those for the Northern Hemisphere, the only significant difference being in the signs of the various values employed in the several formulae discussed in the foregoing. It will be noted that each of the sets of time lines illustrated in FIGS. 7(*a*) through 7(*d*) are designated at one extreme in hours of standard time and at the opposite extreme in hours of daylight saving time. The bisection of the figure eights which would otherwise define the time lines is effected in order to render the sundials readily readable.

The sundial is configured to present a cylindrical surface or face to the sun so that each ray must travel a constant distance from the tip of the gnomon to the cylindrical surface of the sundial for a given declination. Thus, for each unit of time the shadow cast by the tip of the gnomon travels a constant distance around the circumference of the cylindrical surface. As a consequence the time lines can be disposed at regular intervals about the circumference of the cylindrical surface. If the face of the sundial were flat rather than cylindrical, for instance, time lines would have to be placed at progressively increasing intervals from noon to the morning or evening hours. The combination of the cylindrical surface and the location of the tip of the gnomon at the longitudinal axis thereof in the plane of zero declination of the sun on the sundial, permits the use of a linear scale and minimizes distortion in the shadow cast by the gnomon.

As indicated earlier, if the meridian of observation of the sun does not coincide with the standard meridian of the time zone within which the meridian of observation is located, the time as read from the sundial will not be equivalent to standard or daylight saving time. If the lines of time are reconfigured to take into consideration the variations in the rate of apparent travel of the sun as described in the preceding paragraphs, the sundial at any location will provide an accurate reading of Local Civil Time, but Local Civil Time still will not coincide with standard time unless the meridian from which Local Civil Time is determined, i.e., the meridian upon which the sundial is located, coincides with the standard meridian. This problem can be solved if it is realized that the magnitude in the discrepancy between Local Civil Time and standard or daylight saving time depends upon the extent to which the meridian of observation is east or west of the standard meridian. Because the sun appears to move 15° per hour, there should exist a discrepancy of 4 minutes for every degree of longitude the meridian of observation is to one side of the standard meridian. If the cylindrical face of the disclosed sundial is employed, this discrepancy can be avoided by rotating the lines of time collectively to the east or west about the axis of the cylindrical surface. If the point of observation of the sun is to the west of the standard meridian of the time zone in which the sun is being observed, the time lines should be collectively rotated to the west about the longitudinal axis of the cylindrical surface. Similarly, if the point of observation of the sun is east of the standard meridian, the time lines should be collectively rotated to the east. The lines should be rotated the same number of degrees in the appropriate direction that the meridian of observation is to one side of the standard meridian.

The sundials illustrated in FIGS. 5(*a*) through 5(*e*), 8(*a*) and 8(*b*) represent two alternative approaches to the solution of the problem discussed in the foregoing. In the preferred embodiment illustrated in FIGS. 5(*a*) through 5(*c*), the time lines are collectively rotated by rotating the entire cylindrical surface and the time lines together as a unit about the longitudinal axis of the cylindrical surface.

An examination of FIG. 5(*a*) will reveal that the cylindrical surface 22 is carried by a semi-cylindrical body 56. The upper edge 58 of the cylindrical body 56 fits within a channel 60 formed in the body portion 20 by a groove 61 and an arcuate retaining plate 62. Disposed within the channel 60 may be any bearings desired or appropriate to facilitate movement of the cylindrical body 56 about the longitudinal axis 28 of the cylindrical surface 22. The lower portion of the cylindrical body 56 is cradled in an arcuate portion 64 of the body portion 20 of the sundial. Within the interior of the body portion 20, is a retaining bolt 66 which threads into the cylindrical body 56 and secures thereto a retaining clip 68. The retaining clip 68 bears against a portion of the arcuate cradle portion 64 and acts as a brake to secure the cylindrical body portion 56 in place relative to the body portion 20 of the sundial. A sleeve 69 is attached to the bolt 66 to limit movement of the bolt and prevent permanent bending of the clip 68. As a result of the manner in which the cylindrical body 56 is connected to and carried by the body portion 20, the cylindrical body and the time lines carried thereby can be rotated about the longitudinal axis 28 of the cylindrical surface 22 as a unit.

Referring now to the embodiment illustrated in FIGS. 8(*a*) and 8(*b*), the time lines themselves are in this case collectively rotatable to the east or west about the cylindrical surface to compensate for differences between Local Civil Time and the time of the standard meridian of the zone of time in which the sun is being observed. In this embodiment, the time lines are disposed on a cylindrical sheet 70 which is in turn carried by the cylindrical surface 22. The sheet 70 is very thin and is formed of a flexibly resilient material such as plastic. Thus, the sheet 70 is normally planar which facilitates reproduction, shipping and handling and yet can conveniently conform to the shape of the cylindrical surface. In each time zone, a pair of sheets would be employed in conjunction with a given base. That is, separate sheets can be employed for the fall and spring months, as depicted in FIGS. 7(*a*) and 7(*b*), for example. Accordingly, the sheets are removably mountable onto the cylindrical surface by suitable fasteners. Also, the sheets can be rendered rotatable about the axis of the cylindrical support surface for adjustment. Disposed in the sheet carrying the time lines are a number of slots 72 through which pass a like number of screws 74 or other suitable fasteners. These fasteners are secured to the sundial and serve to firmly restrain the sheet carrying the time lines from movement in a direction parallel to the longitudinal axis of the cylindrical surface. Concurrently, these fasteners permit the sheet carrying the time lines to be rotated relative to the cylindrical surface about the longitudinal axis thereof. The fasteners can be removed to permit substitution of sheets.

Regardless of whether the embodiment of FIGS. 5(*a*) through 5(*e*) or 8(*a*) and 8(*b*) are used, the characteristics of the time lines themselves remain the same.

The general form 47 depicted in FIG. 6 (or the "half" forms 34, 36 or 77 depicted in connection with FIGS. 5(*a*) through 5(*c*) and 8(*a*) through 9(*b*)) are similar in form and concept to the configurations depicted in the following United States Patents: Christian; No. 303,118 (Aug. 5, 1884); Crehore; No. 794,787 (July 18, 1905); O'Sullivan; No. 1,651,621 (Dec. 6, 1927); De Bogory; No. 1,674,161 (June 19, 1928).

It can be noted from an examination of FIGS. 7(*a*) through 7(*d*) that in all cases one of the time lines is designated a noon time line of standard time. It will be also recalled from the discussion of FIG. 6 that there exists a point along the time lines, as reconfigured to reflect values of the equation of time at which the equation of time yields a value of zero. Thus, as shown in FIG. 7(*a*) for a location N 8° 15′, there is a point 79 at which there is no variation in the hour lines from a time line strictly parallel to the longitudinal axis of the cylindrical surface. Thus, in each of the systems of lines illustrated in FIGS. 7(*a*) through 7(*d*) there is disposed a relatively short base line 81 which is parallel to the longitudinal axis of the cylindrical surface when the time lines are on the cylindrical surface. This base line intersects the noon time line of standard time at the point at which the time line varies a zero amount from a line strictly parallel to the longitudinal axis of the cylindrical surface. This base line is normally on the cylindrical surface with the time lines and can be used as a reference mark in the rearrangement of the time lines.

It will be also noted from an examination of FIG. 5(*c*) that the sundial includes an indicium 76 directed along a line parallel to the longitudinal axis of the cylindrical surface. This line may extend along the locus of points defining the vertically lowest points of successive circumferential lines extending about the cylindrical surface. In the case of the embodiment illustrated in FIG. 5(*c*) the indicium happens to take the form of opposed arrows 76. However, it will be appreciated that a single straight line or a vernier scale could be also used. In any case, the sundial is set to read in standard time by shifting the relative locations of the base line and the indicium a distance $d_3$ defined approximately by the formula $d_3 = r\pi\theta/180°$, in which $\theta$ equals the angular difference between the longitude of the standard meridian of the zone of time in which the sun is being observed, and the longitude of the meridian of the point of observation of the sun. In other words, either the cylindrical body 56 of FIG. 5(*c*) or the sheet 70 of FIG. 8(*a*) are rotated about the longitudinal axis of the cylindrical surface to move the base line relative to the indicium. The distance may also be $d_3$ defined approximately by the formula $d_3 = r \sin \theta$.

Preferably as illustrated in FIGS. 5(*c*) and 8(*b*), as well as FIGS. 5(*a*) through 5(*d*), a scale 75 is disposed on the body portion in fixed relation to the time lines. This can be accomplished as in FIG. 5 by disposing the scale directly on the cylindrical surface or, on the sheet 70 as illustrated in FIG. 8(*b*). Preferably the scale 75 is calibrated in degrees and extends a relatively short distance about the circumference of the cylindrical surface. The zero degree mark of the scale 75 is axially in line with the base line intersecting the noon time line of standard time and the indicium if the standard meridian of the zone of time which the sun is being observed coincides with the meridian of the point of observation of the sun. Otherwise, by shifting the time lines relative to the indicium a number of degrees equal to the number of degrees the meridian of observation is from the standard meridian, the sundial can be arranged to read directly in the standard or daylight saving time of the zone in which the sun is observed.

It has been found that in addition to giving the time of day in standard or daylight saving time, a sundial can be employed to define both the date in terms of month and day of the year and the declination of the sun for that day. The time of the year, i.e., the month and day, can be determined because of the fact that the declination of the sun varies continuously throughout the year. It can be appreciated from an examination of FIGS. 7(*a*) through 7(*d*), in combination with a consideration of FIG. 6 and the earlier discussion thereof, that the sundial is comprised of a plurality of parallel, spaced apart date lines 77 which are normally disposed on the cylindrical surface and extend at least partially therearound. The distances between the date lines define ranges of declination of the sun and the locations of these date lines along the time lines define the month of the year and the approximate date thereof as the shadow of the tip of the gnomon is cast thereupon or therebetween. Upon close examination, it will be appreciated that certain of the date lines 78 are prolongated and define therebetween distinct months of the year. For instance, the prolongated date lines of FIG. 7(*a*) define the months of July, August, September, October, November and December. The remaining date lines are shorter and define dates within the particular months.

An examination of FIGS. 7(*a*) through 7(*d*) will also reveal that the sundial is comprised of a plurality of lines of declination 80 which are disposed on the cylindrical surface parallel to the line of zero declination 82 referred to earlier. These lines of declination 80 extend on either side of the line of zero declination seriatim to terminal points of the time lines and serve to define the value of the declination of the sun as the shadow of the tip of the gnomon is cast thereupon or therebetween. It will be noted that the values of declination accompanying each line of declination range up to approximately 23.5° on either side of the line of zero declination. The basis for this range and the mechanics of the casting of the shadow on the sundial to correspond with various declinations of the sun throughout the year was discussed in detail in connection with the discussion of FIG. 6. Inasmuch as the line of zero declination is located as described earlier, the range of declinations and the placement of the lines of declination at regular intervals affords an accurate reading of the declination of the sun throughout the year.

A further, very significant advantage can be derived from the use of both date lines and lines of declination of the cylindrical surface of the sundial, viz. the sundial can be very accurately aligned. Knowing the date, the sundial can be manipulated (after leveling as described later) until the shadow of the tip of the gnomon falls on the correct date line. Similarly, knowing the declination for a particular date, the sundial can be manipulated until the shadow cast by the tip of the gnomon falls on the correct line of declination. In either case, since the shadow falls on the proper line, the sundial is properly oriented. In many instances, this mode of orientation may be more accurate than using a magnetic compass.

Sunrise and sunset are defined, respectively, as the time at which the upper limb of the sun either moves above or below the sensible horizon. It can be appreciated from an examination of FIGS. 5(*a*) and 8(*a*) that the cylindrical surface of the sundial is horizontally truncated by a horizontal plane which passes through the sundial in a manner essentially tangential to the surface of the earth at any particular point of observation. The plane of truncation thus essentially coincides with the plane which for practical purposes approximates the sensible horizon at any particular point of observation. The effect of the truncation is to form horizontal edges 84 which bound the cylindrical surface and interrupt the time lines, the lines of declination, and any date lines which extend to the edge 84. As the upper limb of the sun either moves above or below the sensible horizon, a ray of sunlight travelling therefrom by necessity travels in a direction essentially parallel to the plane of truncation or the plane of approximately the sensible horizon and impinges the cylindrical surface at the very edge of the truncation opposite the sun. In other words, during sunrise the ray of sunlight would impinge the western edge of the sundial, while during sunset the ray of sunlight would impinge the eastern edge of the truncation. Therefore, since the date lines are circumferentially projectable about the cylindrical surface to ultimately intersect the edge of the truncation 84, the concurrent intersection of a time line, whether actual or interpolated, with one of the date lines, again either actual or interpolated, at the edge of the truncation 84 provides an indication of the approximate time of sunrise or sunset.

As suggested in the foregoing discussion, the edges 84 of the truncation of the cylindrical surface 22 must be level. Concurrently, the axis of the cylindrical surface must be inclined to the horizontal at an angle equal to the latitude of the particular point of observation. Of course, the relation between the inclination of the cylindrical surface and the truncation thereof is normally fixed. Nonetheless, the problem remains that it may be difficul to arrange the sundial so that the edges 84 are horizontal and the cylindrical surface properly inclined. This may be particularly the case if the sundial is to be portable. As a solution to this problem, suitable leveling means are provided and are connected to the base to indicate when the base and thus the edges 84 of the truncation and the inclination of the longitudinal axis of the cylindrical surface are arranged in a proper configuration. Furthermore, suitable adjusting means are connected to the base to effect any necessary adjustment of the base to a level posture.

In the case of the embodiment illustrated in FIGS. 5(*a*) through 5(*e*), a suitable anchor bolt 86 and associated nut 88 are secured to any suitable monument and serve to anchor the sundial thereto. The anchor bolt 86 passes through an aperture 90 in the body portion of the sundial. An appropriate washer 92 is inserted over the anchor bolt after removing the arcuate retaining plate 62 and the cylindrical body 56. Thereafter, the nut 88 is threaded onto the bolt. Ultimately, the nut and washer will bear against the body portion 20 of the sundial to anchor the sundial to the monument. A number of leveling screws 94, preferably three in number, may be threaded through the body portion 20 of the sundial as illustrated in FIGS. 5(*a*) and 5(*c*). The heads 96 of these anchoring screws should bear against various portions of the monument to form essentially a tripod. Thus, by varying the extent to which the leveling screws protrude from the body portion 20 of the sundial, the sundial can be leveled. An indication of when the sundial is properly oriented can be given by conventional leveling vials containing a liquid and a bubble and configured as illustrated in FIGS. 9(*a*) and 9(*b*). One such vial 98 is provided for each direction in which the base of the sundial and thus the edges of the truncation or the plane thereof must be leveled. Alternatively, a circular bull-seye vial of the type commonly used in surveying instruments may be centrally located and employed to indicate when the sundial is properly positioned. After leveling and anchoring the sundial, the cylindrical body 56 and arcuate retaining plate can be replaced.

The embodiment of the sundial illustrated in FIGS. 9(*a*) and 9(*b*) affords a somewhat different approach to leveling the sundial. This embodiment is intended to be readily portable. Thus, rather than an anchor bolt and separate leveling screws as in the embodiment of FIGS. 5(*a*) through 5(*e*), three legs 100 of variable length are provided. The three legs together form a tripod to support the sundial in a stable manner. Each leg carries a rounded bearing surface 102 intended to directly contact the surface on which the sundial rests. The remaining length of the leg is threaded as at 104 and passes through the base 18 of the sundial. By varying the extent to which each leg protrudes from the base 18, the sundial can be leveled using the leveling vials as described earlier or an inclinometer. The embodiment of the sundial illustrated in FIGS. 5(*a*) through 5(*e*) can be rendered portable by employing the legs 100 of FIGS. 9(*a*) and 9(*b*) threaded into apertures 106.

The sundial illustrated in FIGS. 9(*a*) and 9(*b*) also varies from those discussed earlier in that the gnomon 24 is not arcuate, but rather is straight. The important consideration is that the tip of the gnomon fall on the longitudinal axis of the cylindrical surface 22 of the sundial and in a plane essentially perpendicular to the longitudinal axis and intersecting the cylindrical surface at the line of zero declination of the sun on the sundial.

SUMMARY OF MAJOR ADVANTAGES

It will be appreciated that in providing a sundial according to the present invention certain significant advantages are obtained.

It is of particular importance that the sundial according to the present invention employs the hour angle of the sun to provide an accurate direct reading of standard or daylight saving time.

Another advantage of the invention is that the sundial accommodates and automatically corrects for differences between the Greenwich Hour Angle of the sun and the Greenwich Hour Angle of noon Local Civil Time over the full course of a year.

Still another advantage of the invention resides in the fact that the sundial can be accurately and conveniently adjusted to accommodate and automatically correct for differences between Local Civil Time and standard or daylight saving time in the zone of time in which the sun is being observed.

Yet still another advantage of the invention is that an observer can easily read from the sundial the standard or daylight saving time for the zone of time in which the sun is being observed.

A further advantage of the invention somewhat related to that just mentioned is that the sundial is configured so that the shadow cast by the gnomon is relatively sharp and is not unduly distorted as the earth rotates on its axis.

A corollary of the advantage discussed in the preceding paragraph is the still further advantage that the sundial is configured so that the system of lines which afford a reading of time is linear.

A yet still further advantage of the invention resides in the fact that the sundial is arranged so that the shadow cast by the gnomon provides a reading not only of the time of day but of the month and approximate day of the year as well.

For a particular locality on a chosen date, the sundial of the present invention affords still another advantage in that the times of sunrise and sunset are accurately defined.

The sundial of the present invention also presents a reading of time in either daylight saving time or standard time and thus affords yet still another advantage.

A still further advantage of the invention resides in the fact that the sundial defines the declination of the sun for a particular chosen date.

The sundial of the present invention also provides a yet still further advantage in that the orientation of the sundial can be accurately adjusted in order to afford an accurate reading of the time of day.

As will be appreciated, the invention and its advantages may be practiced in a variety of structural formats, encompassing some but not necessarily all of the features heretofore described. Moreover, other embodiments of the invention may be provided. For example, a transparent spherical housing may be provided for the sundial. In certain instances, the sundial may be massive in nature, possibly many feet in diameter.

In describing the invention, reference has been made to a preferred embodiment; however, those skilled in the art and familiar with the disclosure of the invention may recognize additions, deletions, substitutions, or other modifications which would fall within the purview of the invention as defined in the claims.

What is claimed is:

1. A sundial comprising:

a body portion having a concave inward, cylindrical wall of fixed radius *r*, the sundial being oriented during operation so that the longitudinal axis of said cylindrical wall and the polar axis of the earth together define a plane extending essentially north and south through the earth;

a pair of thin sheets formed of resiliently flexible material, said sheets being alternately mountable in the same location on said cylindrical wall so as to be bendable from a planar configuration and assume a cylindrical configuration and present an outwardly facing cylindrical surface;

said resiliently flexible sheets, when removed from said cylindrical wall, reassuming a planar configuration;

fastening means which can be loosened to enable the mounted sheet to be rotated about said longitudinal axis, and which can be tightened to secure the mounted sheet against rotation;

said fastening means being releasable to permit substitution of said sheets;

a gnomon connected to said body portion, said gnomon comprising a shaft having a relatively heavy portion narrowing to a fine tip, the tip thereof coinciding with the longitudinal axis of said cylindrical surface and casting a shadow on said cylindrical surface dependent upon the hour angle and declination of the sun;

a plurality of generally parallel, equally spaced time lines disposed on said cylindrical surface and extending in a direction essentially longitudinally of the longitudinal axis thereof, wherein:

said time lines are longitudinally bounded by lines extending circumferentially around said cylindrical surface and spaced apart a distance $d_1$ defined approximately by the equation $$d_1 = 2r \sin 23.5°,$$

said time lines vary from time lines strictly parallel to the longitudinal axis of said cylindrical surface by a distance $d_2$ defined approximately by the equation $$d_2 = r\,\pi\,\alpha,/180°$$

said time lines strictly parallel to the longitudinal axis being derivable by the plotting on said cylindrical surface, for given local hour angles, the point of intersection with said surface of a line extending from said tip of said gnomon and inclined to the horizontal and rotated about the vertical to angles defined by the altitude and bearing of the sun for varying declinations thereof, and $\alpha$ being the algebraic difference between the GHA of the sun and the GHA of noon LCT, so that a positive value for $\alpha$ when the sun is at a particular declination indicates that the GHA of the sun precedes noon LCT and requires that said time lines curve to the east of said times lines strictly parallel to the longitudinal axis of said cylindrical surface and a negative value for $\alpha$ when the sun is at a particular declination indicates that the GHA of the sun follows noon LCT and requires that said time lines curve to the west of said time lines strictly parallel to the longitudinal axis of said cylindrical surface; said time lines comprising:

a plurality of principal time lines spaced apart about the circumference of said cylindrical surface a distance $d_4$ defined approximately by the formula $$d_4 = r\,\pi\,(15°),/180°$$

said principal time lines being designated hour lines to represent hours of the day and being marked at one longitudinal extreme in hours of standard time and at the opposite extreme in hours of daylight saving time; and a plurality of secondary time lines parallel to said hour lines and intercalated therebetween to define minutes of time between said hour lines;

the time lines disposed on one of said sheets being configured to designate time occurring from the winter solstice to the summer solstice, and the time lines disposed on the other sheet being configured to designate time occurring from the summer solstice to the winter solstice;

a plurality of parallel, spaced apart date lines disposed on said cylindrical surface and extending at least partially about the circumference thereof, the distance between said date lines defining ranges of declination of the sun and the locations thereof along said time lines defining the month of the year and the approximate date thereof as the shadow of said tip of said gnomon is cast thereupon or therebetween;

said cylindrical wall being horizontally truncated by a horizontal plane passing therethrough in a manner essentially tangential to the surface of the earth at a point of observation;

said date lines being circumferentially projectable about said cylindrical surface to ultimately intersect the edge of said truncation of said cylindrical surface, the concurrent intersection of one of said time lines with one of said date lines at said edge of said truncation indicating approximately the time of sunrise at the western truncation and the time of sunset at the eastern truncation;

a plurality of lines of declination disposed on said cylindrical surface parallel to a line of zero declination and extending on either side thereof seriatim to the terminal points of said time lines to define the value of the declination of the sun as the shadow of said tip of said gnomon is cast thereupon or therebetween;

a plane perpendicular to the longitudinal axis of said cylindrical surface and including said tip of said gnomon intersects said cylindrical surface to define said line of zero declination of the sun thereon; said time lines being collectively rotatable by moving said sheet about said longitudinal axis a distance $d_3$ defined approximately by the formula $$d_3 = r\,\pi\,\theta/180°$$

wherein $\theta$ is the difference between the longitude of the standard meridian of the zone of time in which the sun is being observed and the longitude of the meridian of the point of observation of the sun; so as to correct for differences between LCT and the time of the standard meridian of the zone of time in which the sun is being observed;

a scale calibrated in degrees; and an indicator;

one of said scale and indicator being rotatable with said time lines about said longitudinal axis and including indicia intersecting the noon time line of standard time at a point at which $\alpha$ is of zero magnitude;

the other of said scale and indicator being immovable relative to said time lines and including indicia directed along a line parallel to the longitudinal axis of said cylindrical surface through the locus of points defining the vertically lowest points of successive circumferential lines extending about said cylindrical surface;

said indicator being aligned with said scale so that said scale and indicator provide a measurement of the rotation of said time lines about said longitudinal axis.

2. The sundial of claim 1 wherein:

said body portion has a planar portion so oriented that the longitudinal axis of said cylindrical surface forms an angle with said planar portion equal to the latitude of the particular location of the sundial;

leveling means comprising at least two leveling vials, each disposed on said planar portion and being oriented at an essentially horizontal right angle to the other; said vials being operable to indicate when said base is level and the longitudinal axis of said cylindrical surface inclined to the horizontal by an angle equal the latitude of the particular point of observation; and adjusting means comprising a tripod of legs of adjustable length supporting said base and movable to adjust said planar portions of said base to a horizontal orientation as indicated by said leveling vials.

3. The sundial of claim 1 further comprising:

threaded apertures opening downwardly from the underside of said body portion; and a like number of threaded legs which may be threaded into said apertures and adjusted to level of said base .

4. A sundial according to claim 1 wherein each of said flexible sheets includes elongated apertures, said fastening means extending through said apertures to guide said sheets for movement relative to said cylindrical wall about said longitudinal axis.

5. A sundial according to claim 1 wherein said scale is disposed on each of said flexible sheets.

* * * * *